(12) United States Patent
Ichikawa et al.

(10) Patent No.: US 9,540,010 B2
(45) Date of Patent: Jan. 10, 2017

(54) CONTROL SYSTEM FOR VEHICLE (71) Applicant: TOYOTA JIDOSHA KABUSHIKI KAISHA, Toyota-shi, Aichi-ken (JP)

(72) Inventors: Masahide Ichikawa, Nagakute (JP); Tomohiro Asami, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/861,116

(22) Filed: Sep. 22, 2015

(65) Prior Publication Data

US 2016/0090094 A1    Mar. 31, 2016

(30) Foreign Application Priority Data

Sep. 30, 2014 (JP) .................................. 2014-201254

(51) Int. Cl.
| | |
|---|---|
| *B60W 10/04* | (2006.01) |
| *B60W 30/18* | (2012.01) |
| *B60W 10/06* | (2006.01) |
| *B60W 10/10* | (2012.01) |

(52) U.S. Cl.
CPC ........ *B60W 30/18072* (2013.01); *B60W 10/06* (2013.01); *B60W 10/10* (2013.01); *B60W 2030/1809* (2013.01); *B60W 2710/0644* (2013.01); *B60W 2710/1005* (2013.01)

(58) Field of Classification Search
None
See application file for complete search history.

(56) References Cited

U.S. PATENT DOCUMENTS

| | | | | |
|---|---|---|---|---|
| 6,246,941 B1* | 6/2001 | Sayman | ............... | B60W 10/06 477/109 |
| 8,366,587 B2* | 2/2013 | Inoue | .................. | F02D 41/0205 477/107 |
| 8,938,340 B2* | 1/2015 | Teslak | ..................... | F16H 61/04 477/111 |
| 9,020,716 B2* | 4/2015 | Ota | ..................... | B60W 10/026 701/55 |
| 2008/0146412 A1* | 6/2008 | Sagawa | ................. | B60W 10/06 477/108 |

FOREIGN PATENT DOCUMENTS

| | | |
|---|---|---|
| JP | 2007-032381 A | 2/2007 |
| JP | 2012-218670 A | 11/2012 |

\* cited by examiner

*Primary Examiner* — Dirk Wright
(74) *Attorney, Agent, or Firm* — Oliff PLC (57) ABSTRACT

A control system is for a vehicle. The control system includes an electronic control unit configured to perform a coast downshift, and execute blipping control during performance of the coast downshift. The electronic control unit is configured to determine whether blipping abnormality occurs. The electronic control unit is configured to disengage an engagement element on an engagement side when the blipping abnormality occurs during the performance of the coast downshift. The electronic control unit is configured to increase a speed of the engine in the blipping control. The blipping abnormality is a state that the blipping control is not executed normally during the performance of the coast downshift. The engagement element on the engagement side is an engagement element that is changed from a disengaged state to an engaged state in the coast downshift.

3 Claims, 6 Drawing Sheets

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

BLIPPING CONTROL

CONTROL SYSTEM FOR VEHICLE

INCORPORATION BY REFERENCE

The disclosure of Japanese Patent Application No. 2014-201254 filed on Sep, 30, 2014 including the specification, drawings and abstract is incorporated herein by reference in its entirety.

BACKGROUND OF THE INVENTION

1. Field of the Invention

The invention relates to a control system for a vehicle that includes an engine and an automatic transmission gear device.

2. Description of Related Art

Japanese Patent Application Publication No. 2012-218670 (JP 2012-218670 A) discloses control for increasing an engine speed during a coast downshift such that a rotational speed of an input shaft of an automatic transmission gear device is changed to a synchronous rotational speed after shifting at an early stage during the coast downshift in a vehicle including an engine and the automatic transmission gear device. With this control, control for increasing the rotational speed of the input shaft of the automatic transmission gear device (hereinafter also referred to as "blipping control") can be executed. Engine inertia (so-called engine brake) that acts on the input shaft of the automatic transmission gear device by downshifting can be reduced by this blipping control. Thus, a significant reduction of a vehicle speed during the coast downshift can be suppressed. The coast downshift is downshifting that is performed during coasting. The synchronous rotational speed after shifting is the rotational speed of the input shaft of the automatic transmission gear device after shifting and is determined from a transmission gear ratio after shifting and a rotational speed of an output shaft of the automatic transmission gear device.

However, in the case where the blipping control is not executed during the coast downshift due to some reason in the vehicle disclosed in JP 2012-218670 A, the engine inertia reduction action by the blipping control cannot be obtained. As a result, the vehicle speed is possibly reduced significantly during the coast downshift.

SUMMARY OF THE INVENTION

The invention provides a control system for a vehicle that restricts deceleration caused by a coast downshift in the case where blipping control is not executed during the coast downshift in a vehicle configured that the blipping control is executed during the coast downshift.

A control system related to the present invention is for a vehicle. The vehicle includes an engine and an automatic transmission gear device. The automatic transmission gear device includes a one-way clutch and a plurality of engagement elements. The engagement elements can be engaged and disengaged. The control system includes an electronic control unit. The electronic control unit is configured to perform a coast downshift. The electronic control unit is configured to execute blipping control during performance of the coast downshift. The electronic control unit is configured to determine whether blipping abnormality occurs. The electronic control unit is configured to disengage the engagement element on an engagement side when the blipping abnormality occurs during the performance of the coast downshift. The electronic control unit is configured to increase a speed of the engine in the blipping control. The blipping abnormality is a state that the blipping control is not executed normally during the performance of the coast downshift. The engagement element on the engagement side is an engagement element that is changed from a disengaged state to an engaged state in the coast downshift.

According to such a configuration, the engagement element on the engagement side is not engaged but disengaged when the blipping abnormality occurs during performance of the coast downshift. Thus, deceleration caused by the coast downshift can be restricted. It should be noted that the engagement element on the engagement side is the engagement element that is a target whose disengaged state is changed to an engaged state by the coast downshift.

The electronic control unit may be configured to disengage the engagement element on the engagement side when a vehicle speed exceeds a threshold and the blipping abnormality occurs during the performance of the coast downshift.

According to such a configuration, the engagement element is disengaged only when the blipping abnormality occurs in a vehicle speed range in which the vehicle speed exceeds the threshold. It is considered that, in a low vehicle speed range in which the vehicle speed is lower than the threshold, excess deceleration does not occur even without execution of the blipping control. Thus, unnecessary disengagement of the engagement element on the engagement side in the coast downshift can be prevented in the low vehicle speed range. The vehicle speed range, in which the vehicle speed exceeds the threshold, is set as a high vehicle speed range in which the excess deceleration occurs without the execution of the blipping control.

The engagement element on the engagement side may be engaged by using hydraulic pressure supplied from a solenoid valve. The electronic control unit may be configured to output a command signal to the solenoid valve when performing the coast downshift. The command signal may be a signal for actuating the solenoid valve so as to supply the hydraulic pressure to the engagement element on the engagement side. The electronic control unit may be configured to determine whether the coast downshift is currently performed based on the command signal output to the solenoid valve.

According to such a configuration, whether the coast downshift is currently performed is determined on the basis of the command signal that is actually output from the inside of the electronic control unit to the solenoid valve on the outside of the electronic control unit. Thus, whether the coast downshift is currently performed can appropriately be determined with no influence of some kind of abnormality in the electronic control unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on an embodiment of the invention with reference to the drawings. It should be noted that the same or corresponding portions in the drawings are denoted by the same reference numerals and the description thereof will not be repeated.

Figure 1:
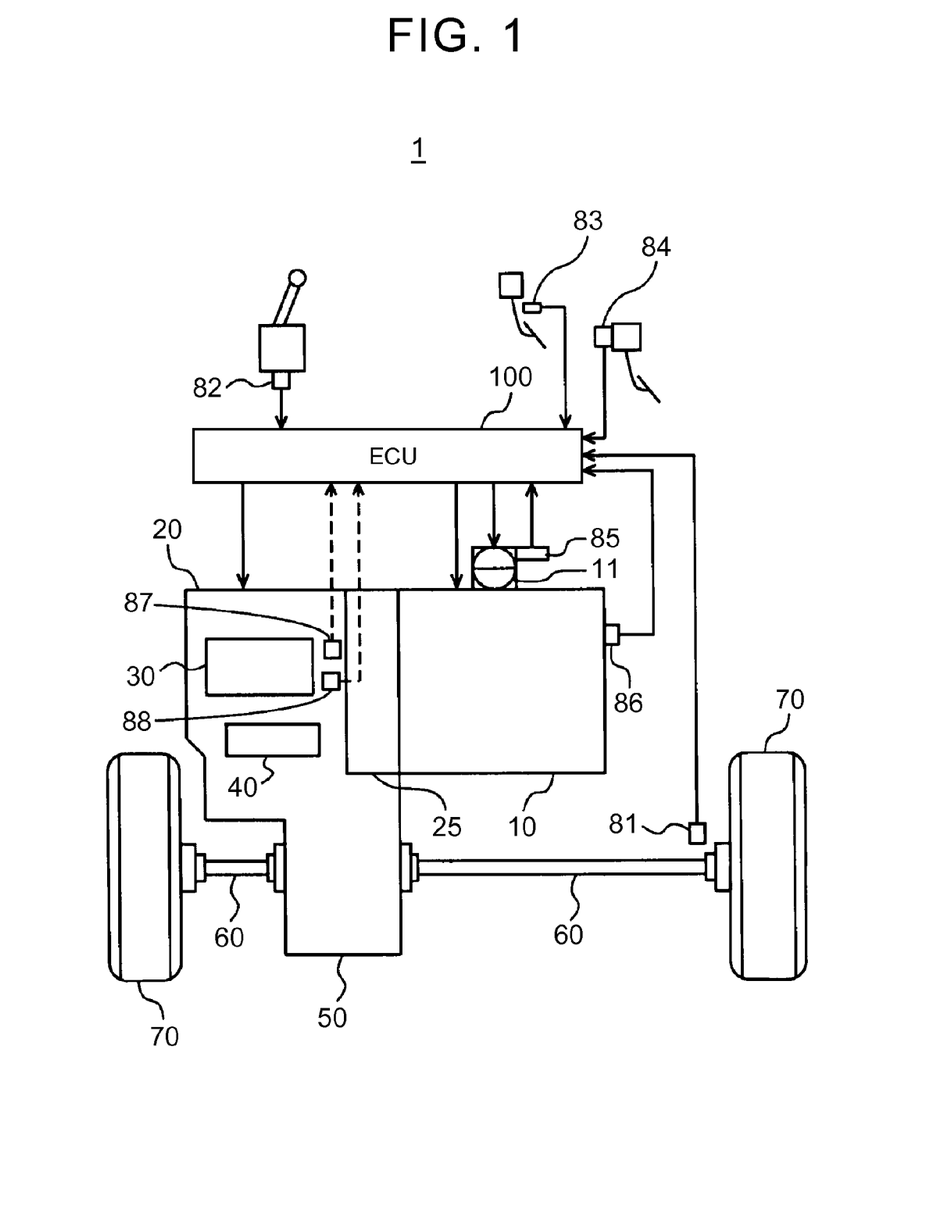
FIG. 1 is an overall configuration diagram of a vehicle.

FIG. 1 is an overall configuration diagram of a vehicle 1 in which an electronic control unit (ECU) 100 as a controller according to the embodiment of the invention is mounted. The vehicle 1 includes an engine 10, a stepped automatic transmission gear device 20, a gear unit 30 for constituting a part of the automatic transmission gear device 20, a hydraulic circuit 40 for constituting another part of the automatic transmission gear device 20, a differential gear 50, a driveshaft 60, drive wheels 70, and the ECU 100.

The engine 10 includes an electronic throttle valve 11. Output of the engine 10 can be controlled by adjusting an opening degree of the electronic throttle valve 11 (a throttle opening degree) or a fuel injection amount from a fuel injector, which is not shown.

The automatic transmission gear device 20 is configured that any gear step of first to sixth gear steps (transmission gear ratios) can selectively be set. An input shaft of the automatic transmission gear device 20 is coupled to a crankshaft of the engine 10 via a torque converter 25. An output shaft of the automatic transmission gear device 20 is coupled to the right and left drive wheels 70 via the differential gear 50 and the drive shaft 60.

Furthermore, the vehicle 1 includes a vehicle speed sensor 81, a shift sensor 82, an accelerator pedal position sensor 83, a stroke sensor 84, a throttle opening degree sensor 85, an engine speed sensor 86, an input shaft rotational speed sensor 87, and an output shaft rotational speed sensor 88.

The vehicle speed sensor 81 detects a vehicle speed. The shift sensor 82 detects a position of a shift lever (a shift position). The accelerator pedal position sensor 83 detects an accelerator pedal operation amount (an accelerator operation amount). The stroke sensor 84 detects a stroke amount of a brake pedal. The throttle opening degree sensor 85 detects the opening degree of the electronic throttle valve 11 (the throttle opening degree). The engine speed sensor 86 detects a speed of the engine 10 (an engine speed NE). The input shaft rotational speed sensor 87 detects a rotational speed NIN of the input shaft of the automatic transmission gear device 20. The output shaft rotational speed sensor 88 detects a rotational speed NOUT of the output shaft of the automatic transmission gear device 20. Each of these sensors sends a detection result to the ECU 100.

A central processing unit (a CPU) and a memory, which are not shown, are mounted in the ECU 100. The ECU 100 executes predetermined computation processing on the basis of information from each of the sensors and information stored in the memory. On the basis of a computation result, the ECU 100 controls each of the equipment in the vehicle 1.

When the shift position is a drive (D) position for a forward travel, the ECU 100 controls the automatic transmission gear device 20 such that any gear step of the first to sixth gear steps is set.

Figure 2:
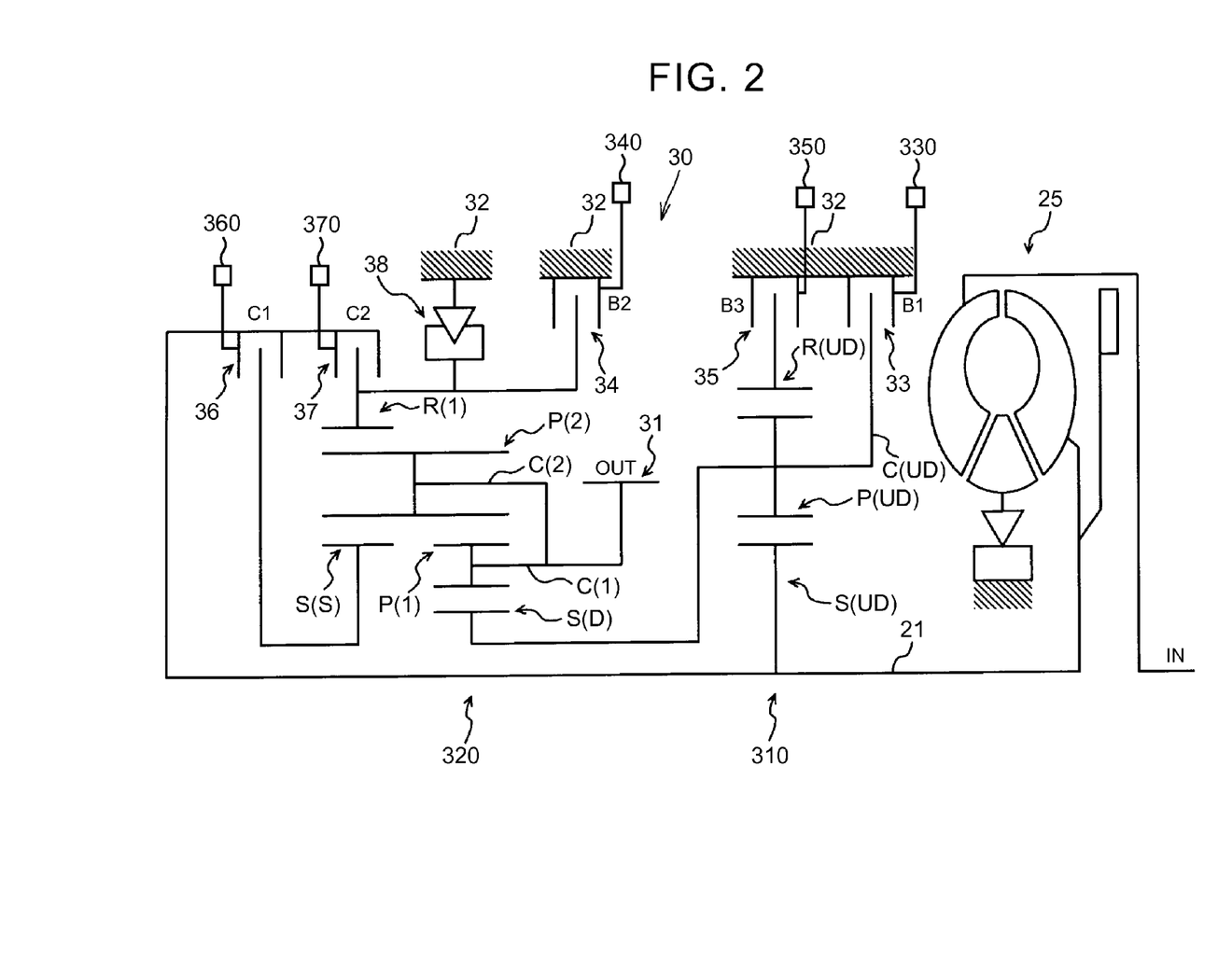
FIG. 2 schematically shows one example of an internal structure of a gear unit of an automatic transmission gear device.

FIG. 2 schematically shows one example of an internal structure of the gear unit 30 of the automatic transmission gear device 20. The gear unit 30 includes an input shaft 21, a first planetary gear device 310 that is a planetary gear unit of single pinion type, a second planetary gear device 320 that is a planetary gear unit of Ravigneaux type, an output gear 31, a plurality of friction engagement elements operated by hydraulic pressure (a C1 clutch 36, a C2 clutch 37, a B1 brake 33, a B2 brake 34, and a B3 brake 35), and a one-way clutch 38.

The input shaft 21 is coupled to the crankshaft of the engine 10 via the torque converter 25.

The C1 clutch 36, the C2 clutch 37, the B1 brake 33, the B2 brake 34, and the B3 brake 35 are engaged by using the hydraulic pressure that is supplied from a plurality of solenoid valves respectively connected thereto. It should be noted that the plurality of solenoid valves is provided in the hydraulic circuit 40 (see FIG. 1).

The first planetary gear device 310 includes a sun gear S(UD), a pinion gear P(UD), a ring gear R(UD), and a carrier C(UD). The sun gear S(UD) is coupled to the input shaft 21. The pinion gear P(UD) is rotatably supported by the carrier C(UD). The pinion gear P(UD) meshes with the sun gear S(UD) and the ring gear R(UD). The ring gear R(UD) is fixed to a gear case 32 by the B3 brake 35. The carrier C(UD) is fixed to the gear case 32 by the B1 brake 33.

The second planetary gear device 320 includes a sun gear S(D), a short pinion gear P(1), a carrier C(1), a long pinion gear P(2), a carrier C(2), a sun gear S(S), and a ring gear R(1). The sun gear S(D) is coupled to the carrier C(UD) of the first planetary gear device 310.

The short pinion gear P(1) is rotatably supported by the carrier C(1). The short pinion gear P(1) meshes with the sun gear S(D) and the long pinion gear P(2). The carrier C(1) is coupled to the output gear 31.

The long pinion gear P(2) is rotatably supported by the carrier C(2). The long pinion gear P(2) meshes with the short pinion gear P(1), the sun gear S(S), and the ring gear R(1). The carrier C(2) is coupled to the output gear 31.

The sun gear S(S) is coupled to the input shaft 21 by the C1 clutch 36. The ring gear R(1) is fixed to the gear case 32 by the B2 brake 34 and is coupled to the input shaft 21 by the C2 clutch 37.

An outer race of the one-way clutch 38 is fixed to the gear case 32, whereas an inner race of the one-way clutch 38 is coupled to the ring gear R(1). The inner race of the one-way clutch 38 is engaged with the outer race thereof at a time of driving at the first gear step (when dynamic power is transmitted from the input shaft 21 to the output gear 31). Thus, the ring gear R(1) is fixed to the gear case 32.

Meanwhile, the inner race of the one-way clutch 38 is not engaged with the outer race thereof at a time of being driven at the first gear step (when the dynamic power is transmitted from the output gear 31 to the input shaft 21). Thus, the ring gear R(1) is not fixed to the gear case 32.

The B2 brake 34 is provided in parallel with the one-way clutch 38. When the B2 brake 34 is engaged, the ring gear R(1) is fixed to the gear case 32. Thus, an engine brake can act due to the engagement of the B2 brake 34 at a time of being driven at the first gear step.

Figure 3:
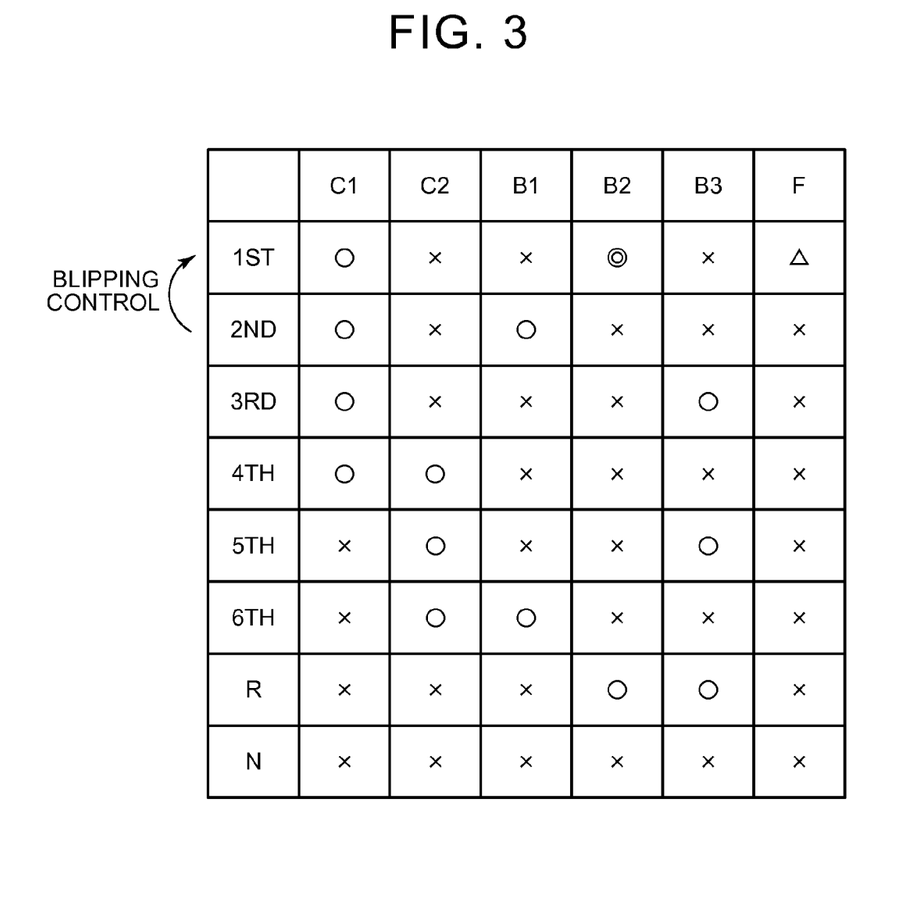
FIG. 3 is an operation table that indicates a corresponding relationship between each gear step and an operation state of each friction engagement element.

FIG. 3 is an operation table that indicates a corresponding relationship between each of the gear steps and an operation state of each of the friction engagement elements. In FIG. 3, circle represents engagement. x represents disengagement. Double circle represents engagement only when the engine brake is applied. Triangle represents engagement only at a time of driving. The forward traveling gear steps of the first to sixth gear steps and the rearward traveling gear step are set by operating the brakes and the clutches in combinations indicated in this operation table.

The ECU 100 computes a target gear step on the basis of the vehicle speed, the accelerator operation amount, and a shift map that is stored in advance. Then, the ECU 100 identifies the operation state of each of the friction engagement elements that correspond to the target gear step on the basis of the operation table in FIG. 3. Thereafter, the ECU 100 outputs a command signal (a solenoid current requested value) to each of the solenoid valves 330, 340, 350, 360 and 370 provided in the hydraulic circuit 40 such that each of the friction engagement elements is brought into the identified operation state. Each of the solenoid valves supplies the hydraulic pressure corresponding to the command signal to the corresponding friction engagement element. In this way, the operation state of each of the friction engagement elements corresponds to the target gear step, and the actual gear step becomes the same gear step as the target gear step.

For example, for upshifting from the second gear step to the third gear step, the ECU 100 outputs a command signal for maintaining the C1 clutch 36 to be engaged, disengaging the B1 brake 33, and engaging the B3 brake 35 to each of the solenoid valves in the hydraulic circuit 40.

Meanwhile, for downshifting from the third gear step to the second gear step, the ECU 100 outputs a command signal for maintaining the C1 clutch 36 to be engaged, disengaging the B3 brake 35, and engaging the B1 brake 33 to each of the solenoid valves in the hydraulic circuit 40.

Furthermore, for downshifting from the second gear step to the first gear step during coasting, the ECU 100 outputs a command signal for disengaging the B1 brake 33 to the solenoid valve 330 that adjusts the hydraulic pressure of the B1 brake 33 (hereinafter referred to as a "B1 solenoid valve"). Additionally, the ECU 100 outputs a command signal for engaging the B2 brake 34 that contributes to application of the engine brake (hereinafter also referred to as a "B2 solenoid current requested value") to the solenoid valve 340 that adjusts the hydraulic pressure of the B2 brake 34 (hereinafter also referred to as a "B2 solenoid valve"). In this way, downshifting from the second gear step to the first gear step is performed, and the engine brake can act. Just as described, the B2 brake 34, which contributes to the application of the engine brake (EB), is an engagement target for a coast downshift from the second gear step to the first gear step (1st). Hereinafter, the first gear step that is set by the coast downshift from the second gear step to the first gear step will also be referred to as the "1st EB", whereas the coast downshift from the second gear step to the first gear step will also be referred to as the "coast downshift to the 1st EB". Coasting refers to a state that the vehicle 1 runs idle in the accelerator operation amount of zero.

In the vehicle 1 with a configuration as described above, in order to change the input shaft rotational speed NIN at an early stage during the coast downshift to a synchronous rotational speed after shifting, the ECU 100 increases torque of the engine 10 during the coast downshift and increases the engine speed NE. In this way, the ECU 100 executes control for increasing the input shaft rotational speed NIN (hereinafter also referred to as "blipping control"). This blipping control reduces engine inertia (the so-called engine brake) that acts on the input shaft 21 of the automatic transmission gear device 20 by the coast downshift. Thus, occurrence of excess deceleration during the coast downshift is restricted. In particular, when a lock-up clutch of the torque converter 25 is engaged, slippage does not occur in the torque converter 25, and the deceleration caused by the engine inertia is significant. Thus, the blipping control is useful. The synchronous rotational speed after shifting is the input shaft rotational speed NIN after the coast downshift and is determined from the transmission gear ratio and the output shaft rotational speed NOUT after the coast downshift. A case where the lock-up clutch of the torque converter 25 is engaged indicates that a pump impeller as an input element of the torque converter 25 is directly connected to a turbine liner as an output element thereof.

However, when the above-described blipping control is not executed due to some factor during the coast downshift to the 1st EB, such abnormality (hereinafter also referred to as "blipping abnormality") possibly leads to the excess deceleration during the coast downshift. The blipping abnormality possibly occurs due to internal failure of the ECU 100, for example.

In view of the above, the ECU 100 according to this embodiment determines presence or absence of the blipping abnormality during performance of the coast downshift to the 1st EB. If the blipping abnormality is present, the ECU 100 does not engage but disengage the B2 brake 34 that is an engagement control target in the coast downshift to the 1st EB. In this way, the deceleration during the coast downshift to the 1st EB is restricted. This point will be described in detail below. The engagement control target is an engagement element as the target that is changed from a disengaged state to an engaged state in the coast downshift.

Figure 4:
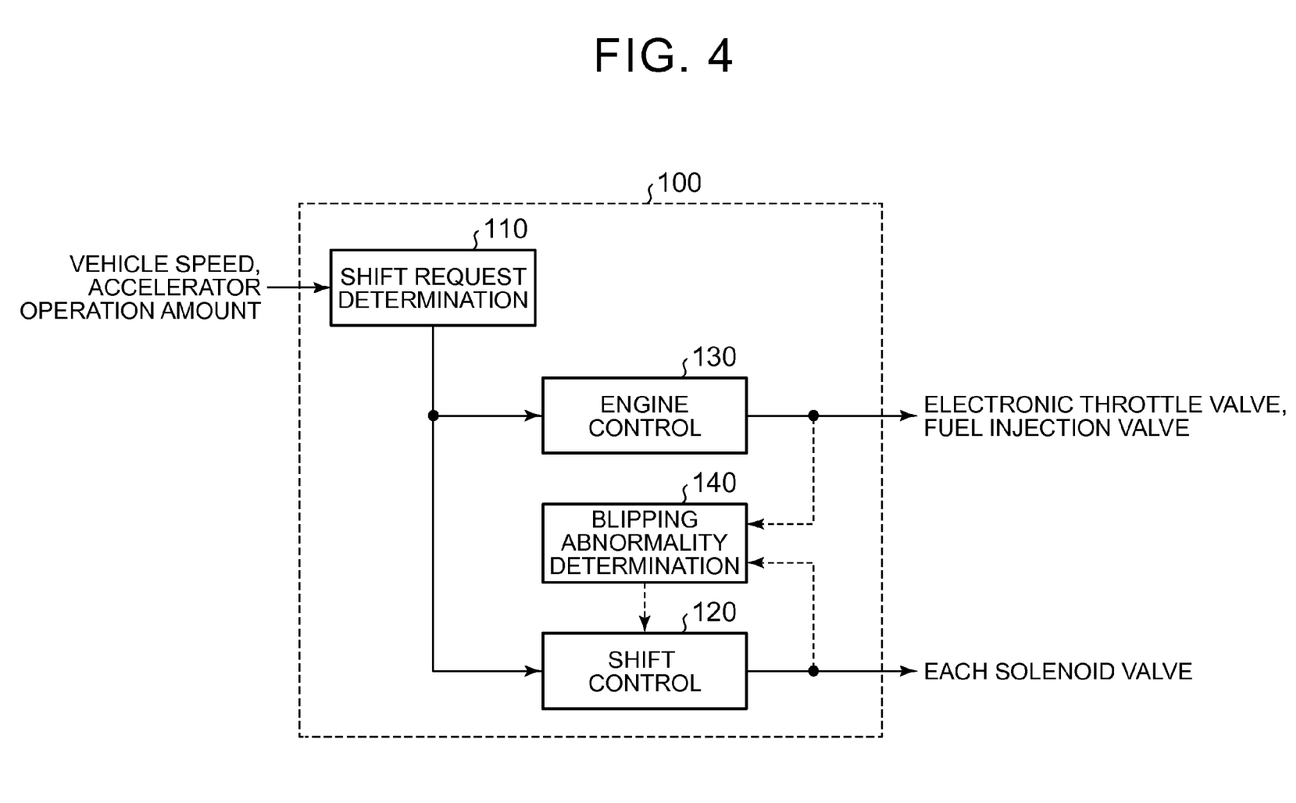
FIG. 4 is a functional block diagram of an ECU related to downshifting.

FIG. 4 is a functional block diagram of the ECU 100 that is related to the coast downshift to the 1st EB. The ECU 100 includes a shift request determination section 110, a shift control section 120, an engine control section 130, and a blipping abnormality determination section 140.

The shift request determination section 110 computes the target gear step on the basis of the vehicle speed, the accelerator operation amount, and the shift map. When the computed target gear step is shifted, the shift request determination section 110 determines that the shift from the target gear step before a shift to the target gear step after the shift is requested. For example, the shift request determination section 110 determines that the coast downshift to the 1st EB is requested when the target gear step is shifted from the second gear step to the first gear step during coasting. It should be noted that, when a device for a user to directly perform a shift request operation (for example, a paddle switch) is provided, the target gear step may be computed in correspondence with the operation of said device. The shift request determination section 110 outputs the target gear step and presence or absence of the shift request to the shift control section 120 and the engine control section 130.

The shift control section 120 outputs a command signal (the solenoid current requested value) to each of the solenoid valves such that the gear step set at the automatic transmission gear device 20 is shifted to the target gear step computed by the shift request determination section 110. The shift control section 120 starts performing the coast downshift to the 1st EB when receiving the signal indicating that the coast downshift to the 1st EB is requested from the shift request determination section 110. More specifically, as described above, the shift control section 120 outputs the command signal for disengaging the B1 brake 33 to the B1 solenoid valve and also outputs the command signal for engaging the B2 brake 34, which contributes to the application of the engine brake, to the B2 solenoid valve.

The engine control section 130 executes the above-described blipping control when receiving the signal indicating that the coast downshift to the 1st EB is requested from the shift request determination section 110. More specifically, the engine control section 130 outputs a signal indicative of a torque-up request of the engine 10 (hereinafter referred to as a "torque-up request signal") to the electronic throttle valve 11 or a fuel injection valve, which is not shown. When a torque-up amount of the engine 10 requested by the torque-up request signal (hereinafter simply referred to as a "torque-up requested amount") is at an appropriate value, the engine speed NE is increased during the coast downshift to the 1st EB to the synchronous rotational speed of the input shaft rotational speed NIN after the coast downshift to the 1st EB. Thus, the inertia of the engine 10 that acts on the input shaft 21 of the automatic transmission gear device 20 during the coast downshift to the 1st EB is reduced, and the occurrence of the excess deceleration during the coast downshift to the 1st EB is restricted.

It should be noted that the engine control section 130 according to this embodiment executes the blipping control only when the coast downshift to the 1st EB is performed in a high vehicle speed range in which the vehicle speed exceeds a threshold V0 (a blipping actuation vehicle speed). When the coast downshift to the 1st EB is performed in a high vehicle speed range in which the vehicle speed exceeds the threshold V0, the vehicle speed is significantly reduced without execution of the blipping control. On the other hand, when the coast downshift to the 1st EB is performed in a low vehicle speed range in which the vehicle speed is lower than the threshold V0, the vehicle speed is not significantly reduced even without the execution of the blipping control. In consideration of this point, the engine control section 130 according to this embodiment executes the blipping control only when the coast downshift to the 1st EB is performed in the high vehicle speed range, in which the vehicle speed exceeds the threshold V0. It should be noted that the blipping control may also be executed in the low vehicle speed range due to such consideration that the deceleration occurs to some extent in the low vehicle speed range, in which the vehicle speed is lower than the threshold V0.

The blipping abnormality determination section 140 determines whether abnormality that prevents normal execution of the blipping control occurs during the coast downshift to the 1st EB.

The blipping abnormality determination section 140 estimates the gear step that is currently set or will be set on the basis of the solenoid current requested value output from the shift control section 120 to each of the solenoid valves. Then, the blipping abnormality determination section 140 determines that the coast downshift to the 1st EB is currently performed when the gear step that is estimated on the basis of the solenoid current requested value during coasting (hereinafter referred to as an "estimated gear step") is shifted from the second gear step to the first gear step. Just as described, the blipping abnormality determination section 140 determines whether the coast downshift to the 1st EB is currently performed on the basis of the solenoid current requested value that is finally output from the shift control section 120 on the inside of the ECU 100 to each of the solenoid valves on the outside of the ECU 100. Thus, whether the coast downshift to the 1st EB is currently performed can appropriately be determined with no influence of some kind of abnormality in the ECU 100.

When determining that the coast downshift to the 1st EB is currently performed, the blipping abnormality determination section 140 determines whether the blipping abnormality has occurred. The blipping abnormality determination section 140 determines whether there is history that the engine control section 130 has output the torque-up request signal to the electronic throttle valve 11 or the fuel injection valve (hereinafter referred to as "torque-up request history"). In addition, when the torque-up request history is present, the blipping abnormality determination section 140 determines whether the torque-up requested amount is at the appropriate value. The blipping abnormality determination section 140 determines that the blipping abnormality has occurred when the torque-up request history is not present or the torque-up requested amount is not at the appropriate value. The blipping abnormality determination section 140 outputs a signal indicative of a determination result of whether the blipping abnormality has occurred to the shift control section 120.

When not receiving the signal indicating that the blipping abnormality has occurred during the coast downshift to the 1st EB from the blipping abnormality determination section 140, the shift control section 120 continues outputting a B2 solenoid current requested value, so as to maintain the engagement of the B2 brake 34 as the engagement control target in the coast downshift to the 1st EB. On the other hand, when receiving the signal indicating that the blipping abnormality has occurred during the coast downshift to the 1st EB from the blipping abnormality determination section 140, the shift control section 120 executes failsafe (F/S) control for stopping output of the B2 solenoid current requested value, so as to disengage the B2 brake 34 as the engagement control target in the coast downshift to the 1st EB.

In particular, the shift control section 120 according to this embodiment executes the failsafe control for disengaging the B2 brake 34 only when the blipping abnormality has occurred in the high vehicle speed range, in which the vehicle speed exceeds the threshold V0. Thus, unnecessary disengagement of the B2 brake 34 can be prevented in the low vehicle speed range, in which the vehicle speed is lower than the threshold V0. The low vehicle speed range is set to a vehicle speed range in which the significant vehicle speed reduction is not expected even without the execution of the blipping control.

Figure 5:
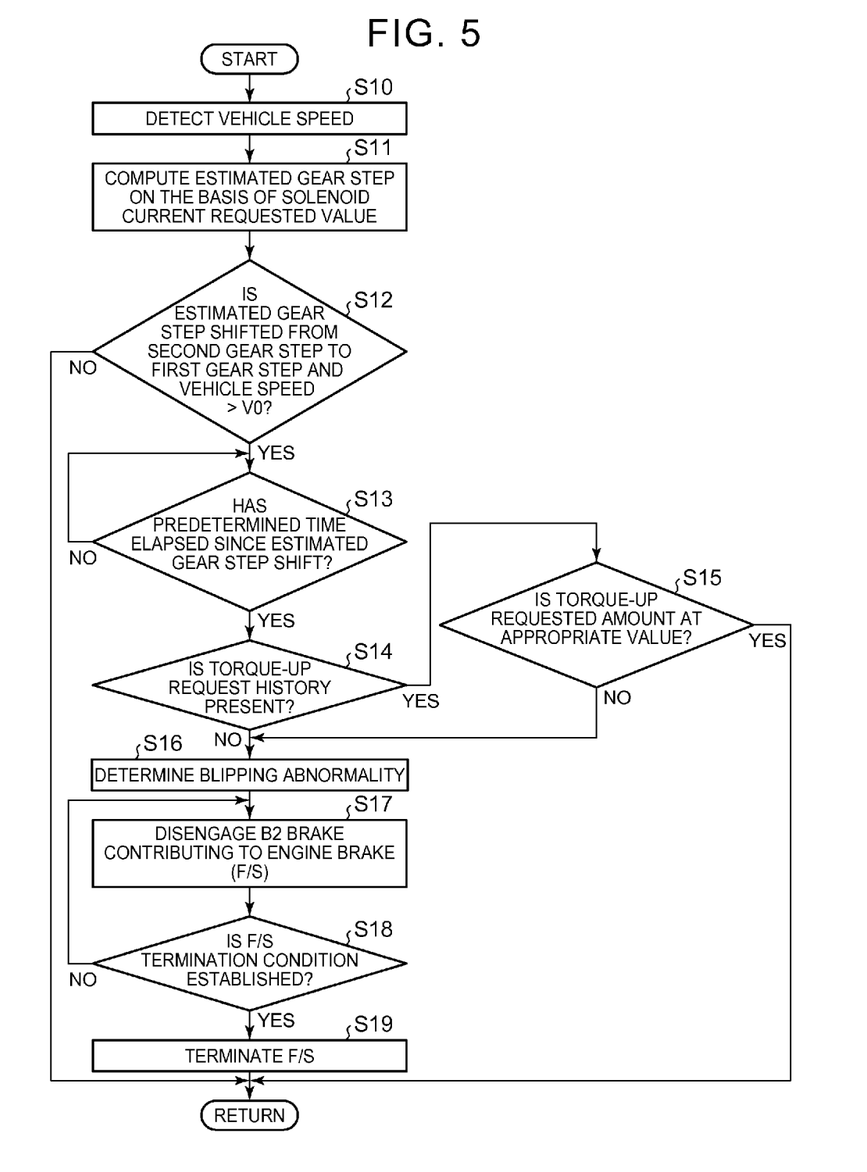
FIG. 5 is a flowchart for illustrating a processing procedure by the ECU.

FIG. 5 is a flowchart for illustrating a processing procedure that is executed by the ECU 100 in order to realize the above-described function. This flowchart is repeatedly executed at predetermined intervals.

In step (hereinafter step is abbreviated as "S") 10, the ECU 100 detects the vehicle speed (that is, obtains the output of the vehicle speed sensor 81). In S11, the ECU 100 computes the estimated gear step on the basis of the solenoid current requested value that is output to each of the solenoid valves.

In S12, the ECU 100 determines whether the estimated gear step is shifted from the second gear step to the first gear step during coasting and the vehicle speed is higher than the threshold VO (the blipping actuation vehicle speed). The ECU 100 terminates the processing if the estimated gear step is not shifted from the second gear step to the first gear step during coasting or if the vehicle speed is at most equal to the threshold V0 (NO in S12).

If the estimated gear step is shifted from the second gear step to the first gear step during coasting and the vehicle speed is higher than the threshold VO (YES in S12), the ECU 100 determines that the coast downshift to the 1st EB is performed in the high vehicle speed range, in which the vehicle speed is higher than the threshold V0. Then, the ECU 100 determines in the processing from S13 to S16, which will be described below, whether the blipping abnormality has occurred.

In S13, the ECU 100 determines whether a predetermined time has elapsed from a time point at which the estimated gear step is shifted from the second gear step to the first gear step during coasting. The ECU 100 starts measuring time by using a counter from the time point at which the estimated gear step is shifted from the second gear step to the first gear step during coasting, and determines whether the counter has reached a value indicating that the predetermined time has elapsed from the time point at which the estimated gear step is shifted from the second gear step to the first gear step during coasting. If the predetermined time has not elapsed (NO in S13), the ECU 100 repeats the processing in S13 and waits until the predetermined time elapses.

If the predetermined time has elapsed from the time point at which the estimated gear step is shifted from the second gear step to the first gear step during coasting (YES in S13), the ECU 100 determines in S14 whether there is the torque-up request history by the blipping control. In S15, the ECU 100 determines whether the torque-up requested amount that has been set from the time point at which the estimated gear step is shifted from the second gear step to the first gear step until the predetermined time elapses is at the appropriate value.

If the torque-up request history is present (YES in S14) and the torque-up requested amount is at the appropriate value (YES in S15), the ECU 100 determines that the blipping abnormality has not been occurred, and terminates the processing. In this way, the engagement of the B2 brake 34 is maintained, and the coast downshift to the 1st EB is performed as being planned.

On the other hand, if the torque-up request history is not present (NO in S14), or if the torque-up requested amount is not at the appropriate value (NO in S15), the ECU 100 determines in S16 that the blipping abnormality has occurred. Thereafter, in S17, the ECU 100 executes the failsafe (F/S) control for disengaging the B2 brake 34 as the engagement control target in the coast downshift to the 1st EB.

The ECU 100 determines in S18 whether a failsafe control termination condition is established. For example, the ECU 100 determines that the failsafe control termination condition is established if the vehicle speed is reduced to a value at which the engagement of the B2 brake 34 can be permitted or if the estimated gear step is shifted to a gear step in which the engagement of the B2 brake 34 can be permitted.

If the failsafe control termination condition is not established (NO in S18), the ECU 100 returns the processing to S17 and continues the failsafe control. On the other hand, if the failsafe control termination condition is established (YES in S18), the ECU 100 terminates the failsafe control in S19.

Figure 6:
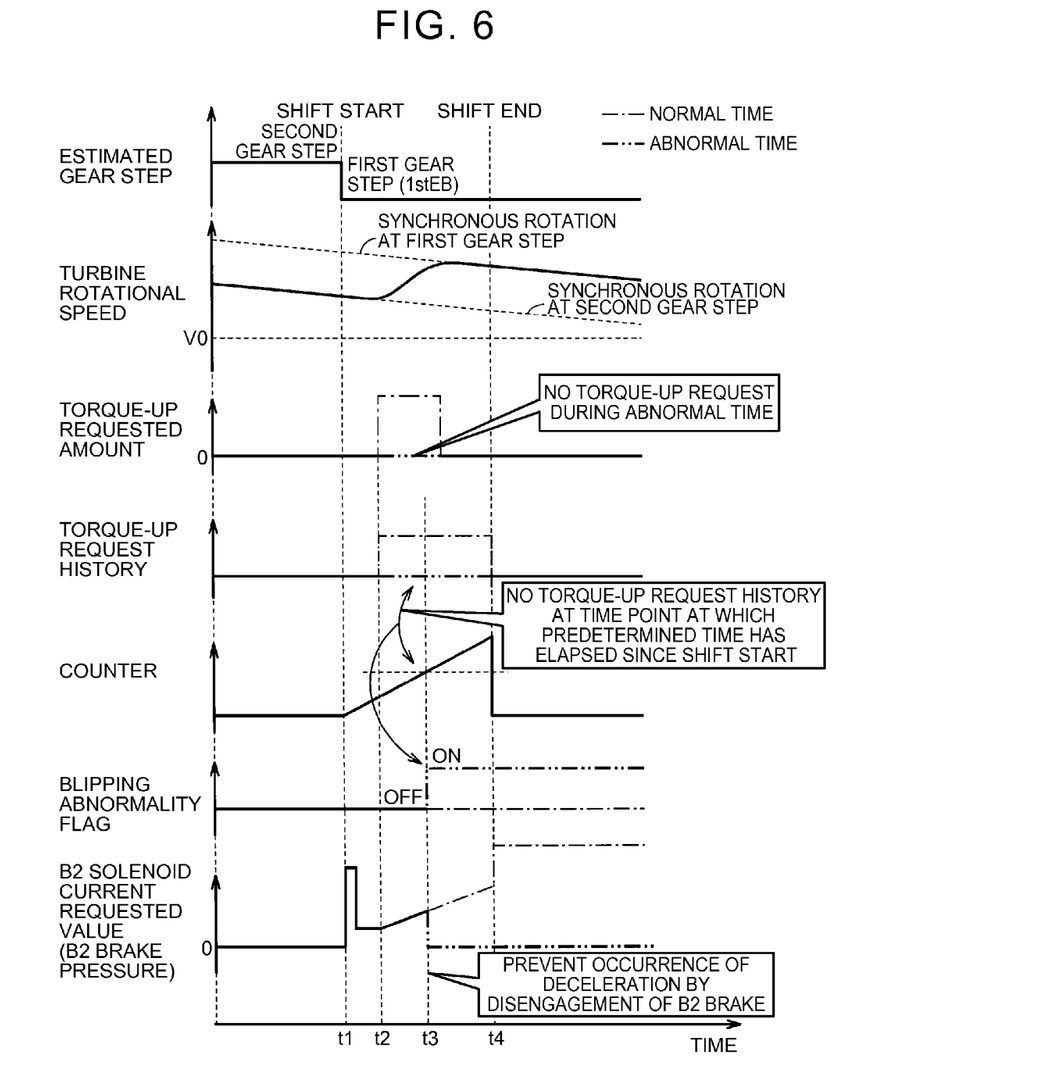
FIG. 6 is a chart of one example of a change in B2 brake pressure at a time of blipping abnormality.

FIG. 6 is a chart of one example of a change in the B2 solenoid current requested value (that is, the hydraulic pressure of the B2 brake 34) when the blipping abnormality occurs during performance of the coast downshift from the second gear step to the first gear step.

The coast downshift to the 1st EB is started when the estimated gear step is shifted from the second gear step to the first gear step at time t1. At this time, the ECU 100 starts outputting the B2 solenoid current requested value to the B2 solenoid valve, and starts measuring time by using the counter.

During normal time, the torque-up requested amount by the blipping control is increased to be larger than 0 and the torque-up request history is turned on at time t2 as shown by one-dot chain lines. However, in the example shown in FIG. 6, the blipping abnormality occurs. Thus, as indicated by two-dot chain lines, the torque-up requested amount is not increased but remains 0, and the torque-up request history is maintained to be OFF.

The torque-up request history is OFF at time t3 at which the counter reaches a value indicating that the predetermined time has elapsed from the time t1, at which the estimated gear step is shifted from the second gear step to the first gear step. Thus, a flag indicating that the blipping abnormality occurs is turned ON, and the B2 solenoid current requested value is stopped being output. In this way, the hydraulic pressure (B2 brake pressure) supplied to the B2 brake 34 becomes 0, and the B2 brake 34 is disengaged at the time t3 onward including time t4 at which the shift is finished. Thus, the engine brake does not act. Therefore, even when the blipping abnormality occurs, the significant reduction of the vehicle speed during the coast downshift to the 1st EB can be restricted.

As it has been described so far, the ECU 100 according to this embodiment determines presence or absence of the blipping abnormality during the coast downshift to the 1st EB. If the blipping abnormality occurs, the ECU 100 does not engage but disengages the B2 brake 34 that is the engagement control target in the coast downshift to the 1st EB. Accordingly, even when the blipping control is not executed, the significant reduction of the vehicle speed during the coast downshift to the 1st EB can be restricted.

Furthermore, the ECU 100 according to this embodiment disengages the B2 brake 34 only when the blipping abnormality occurs in the high vehicle speed range, in which the vehicle speed exceeds the threshold V0, during the coast downshift to the 1st EB. Thus, the unnecessary disengagement of the B2 brake 34 can be prevented in the low vehicle speed range, in which the vehicle speed is lower than the threshold VO.

Moreover, the ECU 100 according to this embodiment determines whether the coast downshift to the 1st EB is currently performed on the basis of the solenoid current requested value that is actually output from the inside of the ECU 100 to the solenoid valves on the outside of the ECU 100. Thus, whether the coast downshift to the 1st EB is currently performed can appropriately be determined with no influence of some kind of abnormality in the ECU 100.

It should be noted that the blipping control is executed, and the presence or absence of the blipping abnormality is determined during the coast downshift from the second gear step to the first gear step in the above-described embodiment. However, the blipping control may be executed, and the presence or absence of the blipping abnormality may be determined during the coast downshift other than the coast downshift from the second gear step to the first gear step. For example, when the blipping abnormality is present during the coast downshift from the third gear step to the second gear step, the B1 brake 33, which is the engagement control target during the coast downshift from the third gear step to the second gear step, may be disengaged.

It should be considered that the embodiment disclosed herein is illustrative in all respects and not restrictive. The scope of the invention is indicated not by the above description but by the claims, and is intended to include all changes that fall within the equivalent meaning and scope to the claims.

What is claimed is:

1. A control system for a vehicle, the vehicle including an engine and an automatic transmission gear device, the automatic transmission gear device including a one-way clutch and a plurality of engagement elements, the engagement elements can be engaged and disengaged, the control system comprising:
an electronic control unit configured to perform a coast downshift, the electronic control unit being configured to execute blipping control during performance of the coast downshift, the electronic control unit being configured to determine whether blipping abnormality occurs, the electronic control unit being configured to disengage the engagement element on an engagement side when the blipping abnormality occurs during the performance of the coast downshift, the electronic control unit being configured to increase a speed of the engine in the blipping control, the blipping abnormality being a state that the blipping control is not executed normally during the performance of the coast downshift, and the engagement element on the engagement side being an engagement element that is changed from a disengaged state to an engaged state in the coast downshift.

2. The control system according to claim 1, wherein the electronic control unit is configured to disengage the engagement element on the engagement side when a vehicle speed exceeds a threshold and the blipping abnormality occurs during the performance of the coast downshift.

3. The control system according to claim 1, wherein the engagement element on the engagement side is engaged by using hydraulic pressure supplied from a solenoid valve, the electronic control unit is configured to output a command signal to the solenoid valve when performing the coast downshift, the command signal is a signal for actuating the solenoid valve so as to supply the hydraulic pressure to the engagement element on the engagement side, and the electronic control unit is configured to determine whether the coast downshift is currently performed based on the command signal output to the solenoid valve.

* * * * *